United States Patent
Sarafijanovic et al.

(10) Patent No.: US 10,649,860 B2
(45) Date of Patent: May 12, 2020

(54) DATA ARCHIVE TIER OF A TIERED STORAGE SYSTEM

(71) Applicant: International Business Machines Corporation, Armonk, NY (US)

(72) Inventors: Slavisa Sarafijanovic, Adliswil (CH); Yusik Kim, Zwolle (NL); Vinodh Venkatesan, Waedenswil (CH); Ilias Iliadis, Rueschlikon (CH); Robert B. Basham, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/697,732

(22) Filed: Sep. 7, 2017

(65) Prior Publication Data

US 2019/0073275 A1    Mar. 7, 2019

(51) Int. Cl.
| | |
|---|---|
| *G06F 11/14* | (2006.01) |
| *G06F 12/08* | (2016.01) |
| *G06F 3/06* | (2006.01) |
| *G06F 16/11* | (2019.01) |
| *G06F 16/27* | (2019.01) |
| *G06F 16/13* | (2019.01) |

(52) U.S. Cl.
CPC .......... *G06F 11/1466* (2013.01); *G06F 3/065* (2013.01); *G06F 3/0605* (2013.01); *G06F 3/0649* (2013.01); *G06F 3/0685* (2013.01); *G06F 12/08* (2013.01); *G06F 16/113* (2019.01); *G06F 16/273* (2019.01); *G06F 16/122* (2019.01); *G06F 16/13* (2019.01)

(58) Field of Classification Search
CPC combination set(s) only.
See application file for complete search history.

(56) References Cited

U.S. PATENT DOCUMENTS

| | | | |
|---|---|---|---|
| 8,706,962 B2 * | 4/2014 | Belluomini | G06F 3/0604 711/114 |
| 9,411,539 B2 * | 8/2016 | Chiu | G06F 3/0647 |
| 9,513,968 B1 | 12/2016 | Fiske et al. | |
| 9,519,438 B1 | 12/2016 | Chatterjee et al. | |
| 9,940,024 B1 * | 4/2018 | Aharoni | G06F 3/061 |
| 10,097,634 B1 * | 10/2018 | Gorantla | H04L 67/1095 |
| 2016/0048355 A1 * | 2/2016 | Iliadis | G06F 3/0607 711/171 |
| 2016/0070766 A1 | 9/2016 | Kathpal et al. | |

OTHER PUBLICATIONS

Unknown, "Amazon Glacier", Amazon, https://aws.amazon.com/glacier/, last accessed Aug. 3, 2017. 6 pages. Copyright 2017.

(Continued)

*Primary Examiner* — Gary W. Cygiel
(74) *Attorney, Agent, or Firm* — Donald J. O'Brien

(57) ABSTRACT

A computer-implemented method for managing a tiered storage system having an archive tier and an active storage tier comprises determining a workload for moving data between the active tier and the archive tier; and determining an assignment of data to be stored across the active tier and the archive tier, based on the determined workload.

13 Claims, 5 Drawing Sheets

(56) References Cited

OTHER PUBLICATIONS

Hansen et al., "Adapting Arbitrary Normal Mutation Distributions in Evolution Strategies: The Covariance Matrix Adaptation", Proceedings of IEEE International Conference on Evolutionary Computation, 1996. 6 pages.

IBM, "IBM Spectrum Archive Enterprise Edition", http://www-03.ibm.com/systems/storage/tape/ltfs-ee/index.html, last accessed Aug. 3, 2017. 1 page.

IBM, "Tape TCO Calculator", http://www-03.ibm.com/systems/storage/tape/tco-calculator/, last accessed Aug. 3, 2017. 1 page.

Iliadis et al., "ExaPlan: Queueing-Based Data Placement and Provisioning for Large Tiered Storage Systems", IEEE 23rd International Symposium on Modeling, Analysis, and Simulation of Computer and Telecommunication Systems, 2015. 10 pages.

Koltsidas et al., "Seamlessly Integrating Disk and Tape in a Multi-tiered Distributed File System", ICDE Conference 2015. 12 pages.

Oracle, "Tape I/O Horizontal Scalability with Oracle Hierarchical Storage Manager 6.0", Oracle White Paper, 3 pages. Copyright 2015.

Wayner, "Cloud review: Amazon, Microsoft, Google, IBM, and Joyent", InfoWorld, Apr. 20, 2016. https://www.infoworld.com/article/3057586/cloud-computing/cloud-review-amazon-microsoft-google-ibm-and-joyent-compared.html, last accessed Aug. 3, 2017. 2 pages.

Hokstad, "Approximations for the M/G/m Queue", Informs, 1978. http://pubsonline.informs.org/doi/abs/10.1287/opre.26.3.510?journalCode=opre, 1 page.

Iliadis et al., "Performance Evaluation of a Tape Library System", 2016 IEEE 24th International Symposium on Modeling, Analysis and Simulation of Computer and Telecommunication Systems. 10 pages.

\* cited by examiner

DATA ARCHIVE TIER OF A TIERED STORAGE SYSTEM

BACKGROUND

The invention relates in general to the field of computerized methods for managing tiered storage systems, which involve determining an assignment of data to be stored on (across) storage tiers of a tiered storage system. The invention further concerns related storage systems and computer programs. In particular, it is directed to methods to design or manage such systems, which take into account the additional workload necessary to archive and prefetch data.

Tiered storage typically relies on assigning different data to various types of storage media, in order to reduce the global storage cost and provide good data access performance. A tier is a homogenous collection of storage devices of a same kind, having all similar if not identical storage characteristics. A tiered system typically involves two, three or more tiers of storage media, e.g., SSD devices, high-end disks, low-end disks, and tape drives. A tiered storage system usually relies on policies that assign most frequently accessed data to high-performance storage tiers, whereas rarely accessed data are stored on low-performance (cheaper) storage tiers.

The read/write performance of a data storage system, typically estimated in terms of throughput or mean response time for a request, depends on the characteristics of the storage devices (e.g., latency and bandwidth), the nature of the input/output (I/O) workload (e.g., the frequency and size of I/O requests to each data object), and on the strategy chosen for assigning data across the storage devices. Given a set of storage devices and an I/O workload, the performance of the system depends on the data assignment strategy. Improper data assignment can result in poor performance and wastage of storage resources.

Tiered storage systems are known, which ensure that the amount of data stored on each device of a tier is balanced. Other systems use iterative heuristic approaches to address this problem using IOPS (I/Os per second) as a performance metric by assuming that each I/O request is of a fixed size. Other methods employ load-balancing mechanisms to ensure that the load on each storage device (the load defined as the expected percentage of time a device is busy serving I/O requests) is the same across all devices. Many load-balancing algorithms exist, such as the Greedy-Scheduling algorithm and the Longest Processing Time (LPT) algorithm.

SUMMARY

Aspects of the disclosure may include a computer implemented method, computer program product, computing device, and system for managing a tiered storage system having an archive tier and an active storage tier. An example method comprises determining a workload for moving data between the active tier and the archive tier; and determining an assignment of data to be stored across the active tier and the archive tier, based on the determined workload.

The above summary is not intended to describe each illustrated embodiment or every implementation of the present disclosure.

Figure 1:
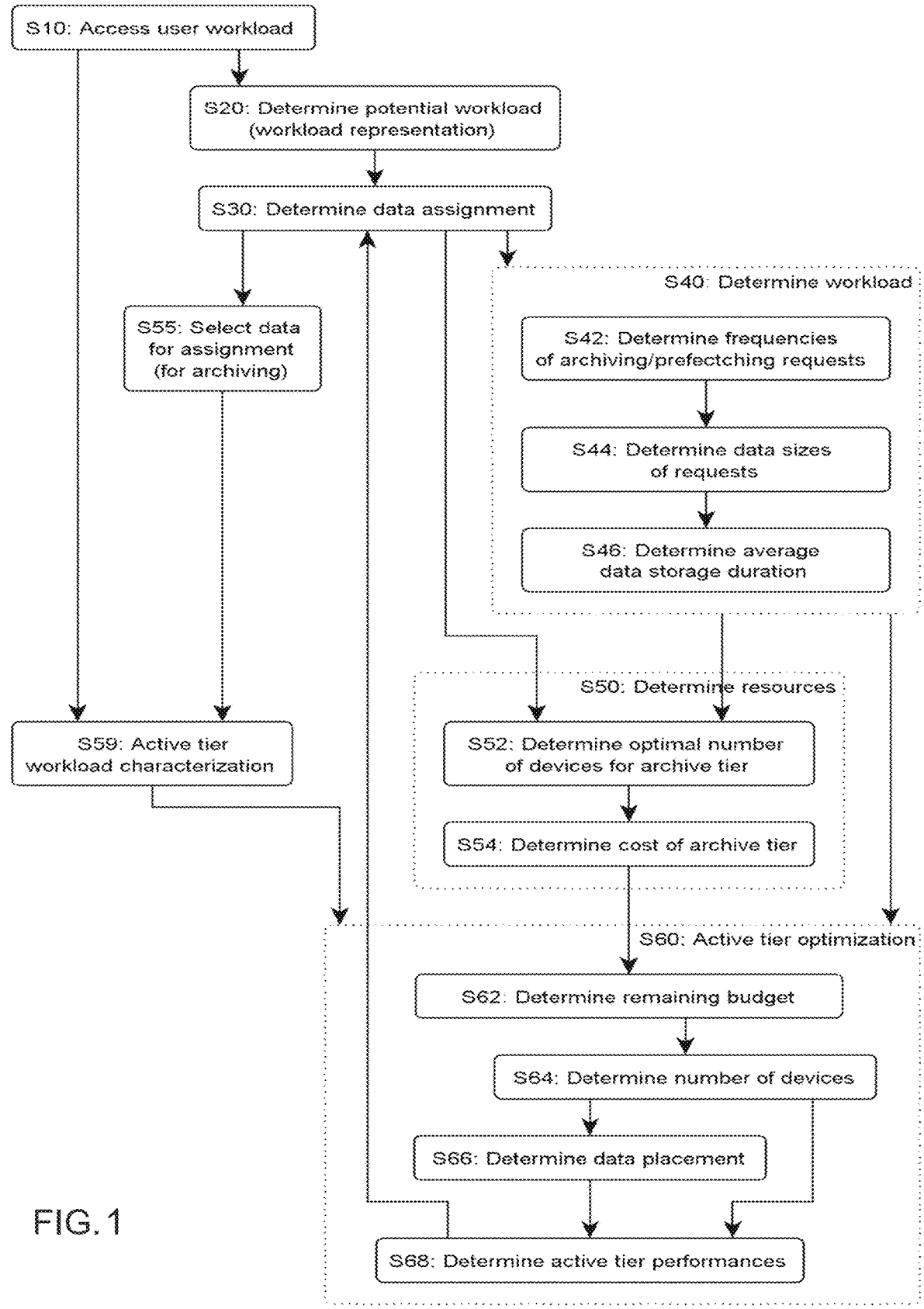
FIG. 1 is a flowchart illustrating high-level steps of a method for designing a tiered storage system, taking into account the archiving and prefetching workload, according to embodiments.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The additional workload due to actually moving data across the tiers is a parameter that usually is ignored for determining data assignments across storage tiers. Taking this additional workload into account, the embodiments described herein enable an improvement to assignment of data to be stored on (across) storage tiers of a tiered storage system. It is to be understood that other parameters can also be taken into account.

In some embodiments, the workload determined is a prefetching workload, i.e., the additional workload needed for moving data from the archive tier to the active tier. In other embodiments, the workload determined is an archiving workload, i.e., the additional workload needed for moving data from the active tier to the archive tier. In yet other embodiments, both the prefetching workload and the archiving workload are taken into account.

In some implementations, embodiments described herein are used for designing or re-dimensioning the storage systems and hardware resources are determined for one or each of the active tier and the archive tier, based on both the assignment of data and the workload determined. For example, an optimal number of devices may be determined for the archive tier, based on the determined assignment of data, the determined workload and characteristics of such devices, in some such embodiments. In some such embodiments, this optimal number of devices is determined based on one or more average frequencies of requests (to move data from the active tier to the archive tier and from the archive tier to the active tier), as well as one or more average data sizes of such requests, which are determined as part of the additional workload.

Determining this workload may further comprise determining one or more average storage durations of data as stored on the active tier before being archived to the archive tier. In that case, the determination of the optimal number of devices for the archive tier may further be based on such average storage durations, in addition to the frequencies and data sizes of the requests.

In other implementations, embodiments described herein are used at run-time, in an existing storage system, e.g., in order to provision resources in the archive tier, based on both the assignment of data and the workload determined. As another example, embodiments described herein can be used to manage data in the system and re-assign data across the storage tiers, i.e., to move data across the active tier and the archive tier, based on the determined assignment of data.

In some embodiments, after having determined the workload, performances of the active tier are determined based on the determined workload. The determination of the assignment of data can thus be based on the determined performances. In some embodiments, once an assignment of data has been determined, an updated workload can be determined, based on the determined assignment of data, and so on. i.e., an iterative process can be contemplated.

In some embodiments, a cost of the archive tier is determined based on the determined workload. Thus, the performances of the active tier can be determined based on both the determined workload and the cost of the archive tier, which, in turn, impacts the assignment of data as subsequently determined and the updated workload.

In some embodiments, said cost is determined based on an optimal number of devices for the archive tier. As said earlier, this number may be determined based on the determined workload, the determined assignment of data and characteristics of such devices. Moreover, a remaining budget for the active tier can be determined based on the determined cost of the archive tier and a budget constraint. The performances of the active tier are eventually determined based on said remaining budget, in some such embodiments.

The embodiments described herein can advantageously be applied to a plurality of clients. For example, in some embodiments, a respective number of devices in the archive tier is determined for each of a plurality of clients of the tiered storage system. This number is optimized based on workload characteristics and data assignments as determined for each of the plurality of clients.

In some embodiments, an improved tiered storage system comprises an archive tier, an active storage tier, and a control unit. The control unit is configured for determining a workload and determining an assignment of data to be stored across the active tier and the archive tier, based on the determined workload, consistently with the principles of the present methods. In some such embodiments, the archive tier comprises a tape library and/or an optical library, whereas the active tier comprises solid-state drives and/or hard-disk drives. Any or each of the active tier and the archive tier can also be a cloud-based storage tier, in some embodiments.

A class of big data storage solutions assume a use case that requires high performance low latency storage devices such as solid-state drives (SDDs) or hard-disk drives (HDDs) for processing currently active data, but a large majority of the data is not accessed or processed for extended periods of time. Examples of such use cases are: storing and reprocessing video recordings in TV and film industry, storing and accessing video surveillance data, reprocessing of astronomical observations or scientific experiments data. In some such use cases, it is cost ineffective or prohibitive to store all or a majority of the data at all times on expensive, fast access devices such as HDDs and SSDs.

A cost effective solution for the above use cases would be to archive the infrequently accessed data to a cheap (typically high access-latency) storage such as tape libraries, optical disk libraries, or cloud, and prefetching the data to a properly dimensioned, fast access storage only during the periods when it need be accessed or processed.

However, and as it may be realized, the archiving and prefetching data also comes at a cost, which depends on the frequency of such operations, amongst other possible parameters. E.g., in tape systems, while the cost of tape storage media (the tape cartridges) is very low, frequent archiving and prefetching of data increases the number of shared (but expensive) tape drives needed for writing and reading the tape cartridges, i.e., for archiving and prefetching the data.

Therefore, in many use cases, it may be far suboptimal to dimension and operate a storage system to archive all the cold data (data currently not used). For example, for data that needs to be prefetched relatively often, or for data that has a relatively short lifetime, it might be less costly to provision and use devices on fast access tiers, rather than to invest in more drives or in additional cloud services for archiving and prefetching operations.

Thus, the present inventors have realized, that solutions are needed which take into account the archiving and/or the prefetching workloads, i.e., the additional workload necessary for moving data from the active tier to the archive tier and/or moving data from the archive tier to the active tier.

Figure 2:
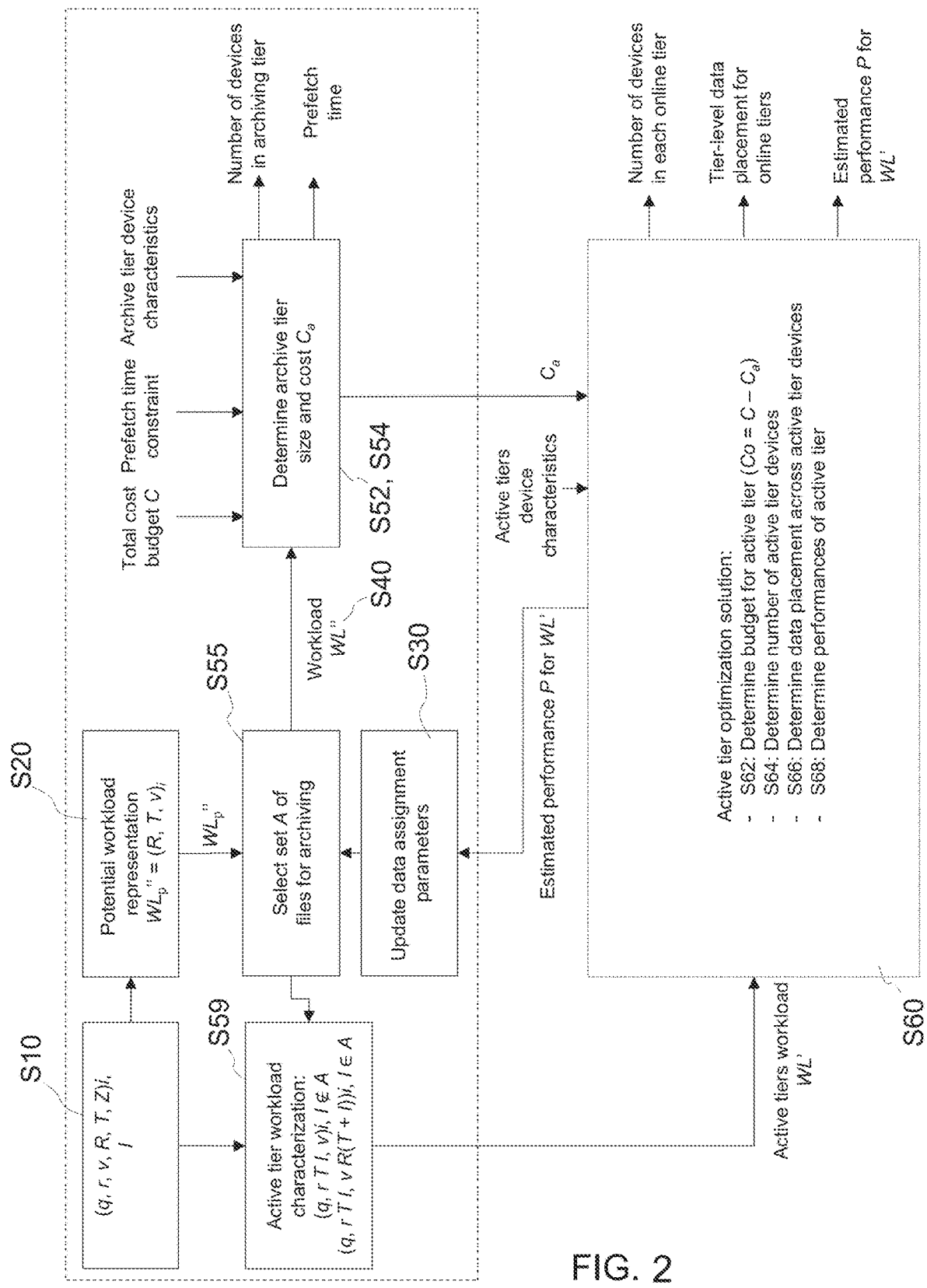
FIG. 2 is another flowchart, depicting steps of a method as in FIG. 2, and showing additional details, inputs and outputs of the steps, as involved in embodiments.
Figure 3:
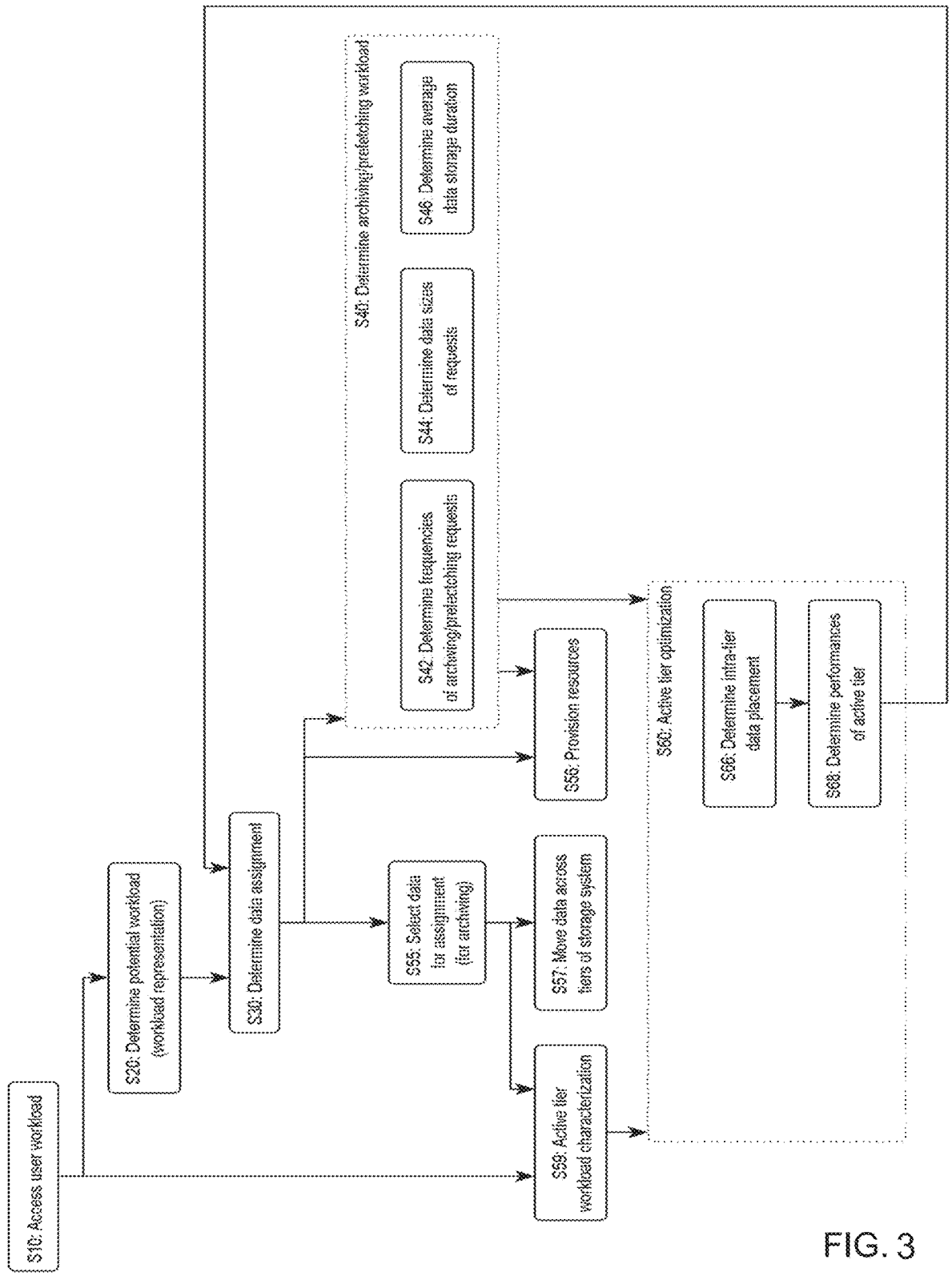
FIG. 3 is a flowchart illustrating high-level steps of a method for managing a tiered storage system at run-time, according to embodiments.
Figure 4:
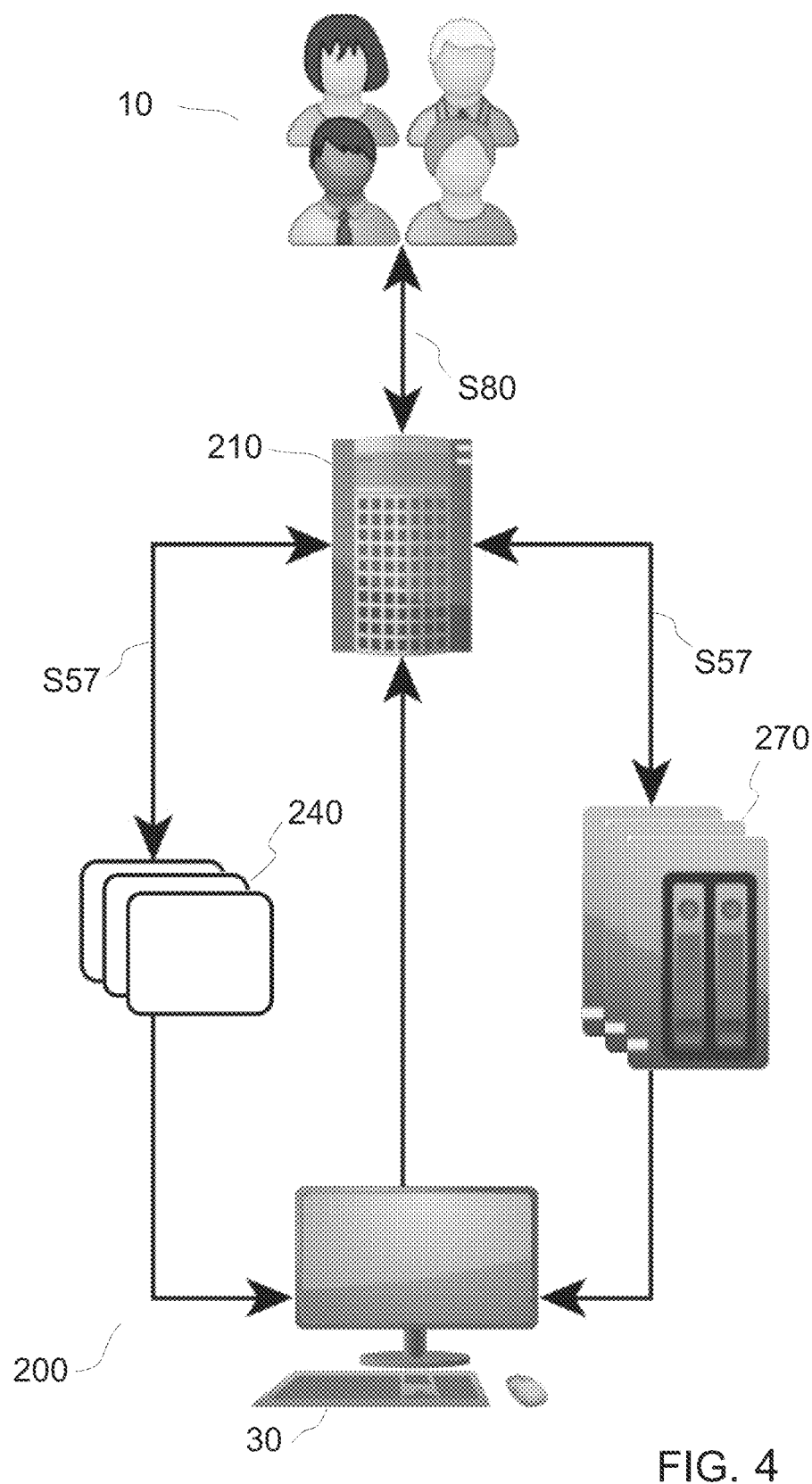
FIG. 4 schematically represents such a tiered storage system, as in embodiments. The system comprises a control unit suited for implementing method steps according to embodiments.

In reference to FIGS. 1-3, a computer-implemented method for managing a tiered storage system 200 is discussed. This system 200 comprises an archive tier 270 and an active storage tier 240, as seen in FIG. 4. Examples of tiered storage systems are later described in detail, in reference to FIG. 4.

The method includes determining S40 a workload necessary for moving data from the active tier to the archive tier and/or moving data from the archive tier to the active tier. Then, an assignment of data to be stored across the active tier and the archive tier is determined S30, based on the determined workload.

As present Inventors have realized, a parameter that usually is ignored for determining data assignments across storage tiers is the additional workload that is necessary to actually move data across the tiers. This additional workload translates into additional resources needed in each of the archive tier and the active tier to archive and/or prefetch data, i.e., to move data from the active tier to the archive tier and/or, conversely, from the archive tier to the active tier. Such additional resources notably include the additional bandwidth necessary for devices in each of these tiers to move the data.

Taking this additional workload into account, an improved optimization of the tiered storage system can be achieved. This optimization may for instance include the determination of an optimal number of storage devices for the archive tier. The optimization may further take into account performances and/or costs of the devices in one or each of the tiers.

As apparent from FIG. 1, 2 or 3, block S30 (data assignment) is typically the result of an update or an iterative process, whereby a data assignment is first determined S30, based on which a workload is obtained S40, prior to updating the data assignment S30 based on the obtained workload, and so on.

The active tier is also referred to as online tier. It stores data that is immediately available for I/O requests. The online tier may notably include a hosting service, a cloud storage service, an online file storage provider, or a cyberlocker.

The archive tier is also referred to as an archival tier. As discussed herein, the archive tier may include nearline storage, wherein data stored are not immediately available, but can be made quickly and automatically available. The archive tier may further include offline storage (not immediately available), which may not be fully automatic (e.g., it requires human intervention). The archive tier may be cloud-based as well.

Thus, the embodiments herein can be used in (or for designing) cloud-based storage systems, or in (or for designing) systems involving optical and/or tape libraries, or in mixed systems (e.g., systems involving a local active tier and a cloud-based archive tier).

As noted above, the workload considered here can include two components. The first component is referred to as an "archiving workload". The archiving workload relates to additional resources needed for archiving data into the archive tier. The second component can be regarded as a data re-assignment workload, i.e., it refers to additional resources needed to place data back into the active tier, essentially for data prefetching purposes, when serving S80 requests from clients 10. Thus, the second component is hereafter referred to as a "prefetching workload".

The step S30 of determining the data assignment can, for instance, amount to determine which data (i.e., which files or which types/categories of files) should be moved from the active tier to the archive tier and, conversely, from the archive to the active tier. The data assignment can be done with a fine granularity, especially at run-time. Yet, things go differently at build-time (i.e., when designing the system), where a mere amount or proportion of data may already suffice, for the purpose of, e.g., designing or re-dimensioning the system.

Indeed, the present approach may be used to (re-)design a storage system. For a system to be designed (the system does not actually exist yet), given amount of data (typically be an estimated amount of data, or a reference amount of data) and users data access may be assumed, from which a data assignment can be computed, based on the archiving and/or prefetching workload. The resulting data assignment then serves as a basis to design the system. The amount of data considered in input may for instance essentially consist of user (client) data. In addition, additional inputs (such as the expected user workloads) may be needed to design the system. More sophisticated approaches can be contemplated, which may for instance rely on actual data samples, e.g., data representative of typical use case scenarios.

In variants, the system may already exist and function, in which case the present approach can be used to re-dimension or partly redesign, or determine additional resources or provision existing resources in the system. Such resources may include hardware resources (i.e., the number of devices to be provided in the archive tier) or pertain to allocated resources (e.g., customer bandwidth, to match a given level of service).

In other variants, the above data assignment can be used to effectively redistribute the data in existing storage systems, whereby data are actually moved S57 from one tier to the other. In such embodiments, the archiving and/or prefetching workloads being primarily considered does not preclude other criteria. For example, data access frequency can additionally be taken into account, as an additional factor to effectively decide which data to assign to which tier in practice. In such embodiments, in addition to considering the data access frequencies, the archiving and/or prefetching workloads are taken into account to refine the data assignment across the tiers. More generally, the archiving and/or prefetching workloads as considered herein may be considered as additional parameters entering a complex optimization procedure.

A "data assignment", as determined at block S30, includes a decision as to how to distribute data across the tiers. It may further include decisions as to how to arrange the data within each tier. A data assignment as used herein can be synonymous with "data placement". However, the present data assignment is not limited to intra-tier data placement.

The embodiments described herein are discussed with respect to one active tier and one archive tier for purposes of explanation. However, it is to be understood that in other embodiments, several active tiers and/or several archive tiers are used.

Data assignments as determined herein may be indicative only, even at run-time. This is, for instance, the case when the storage algorithm as implemented at run-time (e.g., by a server 210, see FIG. 4) attempts to enforce a determined data assignment when actually storing the data. Yet, the determined assignment may not be strictly enforced, e.g., because additional run-time parameters may not allow the strict enforcement. For example, a dynamic data assignment scheme can be imposed to re-allocate data, even if a previously decided data assignment has not fully been enforced yet. In other embodiments, data assignments as determined herein are strictly enforced by the storage system 200.

In embodiments described herein, for an existing or assumed user workload, a potential archiving and prefetching workload can be assumed or (mathematically) modeled S20, e.g., based on assumed or modeled S10 user workload parameters. Based on the potential archiving and prefetching workload S20 and an initially assumed data assignment S30, an initial archiving and prefetching workload S40 is determined. Then, this initial workload can be refined iteratively, e.g., by estimating its impact on performances S68 of the active tier and/or the archive tier cost S54. Parameters such as obtained at steps S54, S68 can then be used to refine the data assignment S30 and, in turn, the workload S40 (and so on).

Referring to FIGS. 1 and 2, a first class of embodiments is now described in detail, which concern the design, optimization, customization and resizing of tiered storage systems. Such steps may belong to the lifecycle of storage systems and are considered to form part of methods for managing such storage systems, for the purpose of the present patent application.

In such embodiments, hardware resources can be determined S50 for one or each of the active tier and the archive tier. Block S50 relies on both the assignment of data and the workload determined at blocks S30 and S40. That is, a data assignment is needed, e.g., to estimate the overall memory capacity of devices in either tier. Yet, the additional workload is further needed to estimate, for example, the additional bandwidth needed for the devices.

Such hardware resources can be determined for only one of the tiers, such as for the archive tier. Being able to optimize hardware resources for the archive tier is advantageous. In prior approaches, archive tiers are rarely subjected to optimizations. Block S50 can notably include the determination S52 of an optimal number of devices for the archive tier, based on characteristics of such devices, in addition to the data assignment and the workload as previously determined at blocks S30 and S40. An optimal number of devices can notably be achieved by determining the minimal number of devices, which, in view of their characteristics, gives rise to tier-level characteristics matching requirements arising from blocks S30, S40. Examples of algorithms are given in more detail below. Note that the active tier too can be optimized.

The workload determination at block S40 can notably comprise determining S42, S44 an average frequency of requests to move data from one tier to the other (e.g., from the archive tier to the active tier, as for prefetching data), as well as an average size of data associated with such requests. More generally, one or more frequencies and data sizes may need be determined. Distinct frequencies may for instance be associated with respective data categories. As another example, distinct frequencies can be identified in respect of sub-tiers from which data are expected to be moved.

Such frequencies can, for example, correspond to frequencies of requests to archive data into the archive tier and/or frequencies of requests to prefetch data from the archive tier. The average data size of the requests corresponds to an amount of data read, on average, by devices of the active and archive tiers, during a request to archive or prefetch data and to satisfy this request. In practice, the data size associated with an archiving or prefetching request can be considered as the size on memory of the files involved, on average, in such a request.

The determined frequencies and average data sizes of requests may then be used at block S50 to estimate additional resources necessary in either tier, notably when determining S52 the optimal number of devices for the archive tier.

In addition, block S40 can further comprise determining S46 an average storage duration of data stored on the archive tier (or several storage durations, for the same reasons as evoked above). Such a storage duration corresponds to the average period of time during which data are stored on the active tier before being archived to the archive tier. This additional parameter can advantageously be taken into account in a model, as described in more detail below, in order to, for example, achieve improved data assignments, archiving/prefetching workloads and hardware resources.

As seen in FIGS. 1 and 2, blocks S30-S40 can be iteratively computed. For instance, the present methods can comprise, after determining S40 the workload, determining performances S68 of the active tier. Block S68 can notably use an outcome of block S40 (the determined workload) in input. In turn, block S30 (aiming at determining a data assignment) can be based on the performances as determined at block S68. Moreover, an updated workload can subsequently be determined (following the path S40-S60-S30-S40), based on the assignment of data as determined at block S30, and so on. That is, the process can be further iterated, such that a further assignment of data can be achieved, based on the updated workload, by further updating the estimated performances of the active tier, etc.

The performances computed at block S68 typically take the device characteristics as input. For example, a value of the performance metric may be estimated based on a previously determined data assignment and an accordingly determined number of storage devices for the active tier.

As seen in FIGS. 1 and 2, other parameters can intervene or be computed. For example, a cost of the archive tier can be determined at block S54. This cost is generally computed based on the determined workload S40, though additional parameters may be considered, including parameters derived from this workload. For example, and as explained earlier, this cost may notably be determined S54 based on an optimal number of devices for the archive tier.

As a result, the performances of the active tier can be obtained S68 based on the determined workload S40 and cost S54, which impacts the determination S30 of the data assignment and, in turn, the updated workload S40.

Once a cost $C_a$ of the archive tier has been estimated, the remaining budget for the active tier can optionally be determined S62, based on the determined cost and a budget constraint C (e.g., as a mere difference $C-C_a$, as assumed in FIG. 3). Note that the remaining budget normally impacts the performances of the active tier, inasmuch as it determines the maximal number of devices allowed for the active tier. Of course, such considerations apply only when designing or upgrading a storage system under budget constraints.

In addition, additional parameters can be taken into account, as seen in FIG. 2. In particular, the determination of the optimal number of devices for the archive tier can further be based on a prefetch time constraint. Moreover, an overall budget constraint C may be considered, which notably impacts block S52. In general, a budget constraint may apply to one of the tiers only or, in variants, to all the tiers, as assumed in FIG. 2. Additional details are provided in below.

A second class of embodiments is now discussed in reference to FIG. 3, which illustrates an example method for managing a tiered storage system at run-time. The method of FIG. 3 is essentially similar to that of FIG. 1. That is, archiving/prefetching workload is determined S40, based on which a data assignment can be obtained S30 and, this, in an iterative manner. That is, performance of the active tier are determined at block S68, which in turn allows the data assignment to be refined S30 and then the workload to be updated S40, etc.

However, the data assignment as eventually obtained at block S30 is now used to effectively move S57 data across the storage (active and archive) tiers. In addition, the assignment of data and the workload determined at blocks S30, S40 can be used, in some embodiments, to provision resources S56 in the archive tier, e.g., on a per-client or per-application basis, as needed to meet a given service level, or requirements set forth by clients/applications.

Referring to FIG. 4, an example tiered storage system 200 is discussed. The storage system 200 comprises an active storage tier 240, an archive tier 270, and a control unit 30. The latter is generally configured to perform all or part of the methods discussed above with respect to FIGS. 1-3. That is, the unit 30 determines the archiving and/or prefetching workload, as well as data assignments, based on such workload. In addition, the unit 30 can be generally configured to perform all or part of the various embodiments of the computerized methods described earlier.

The unit 30 can, in some embodiments, be implemented directly in a server 210, which typically forms part of the tiered storage system 200. As illustrated in FIG. 4, the server 210 is in data communication with storage devices of the active and archive tiers 240, 270, as well as with the control unit 30. Again, the system 200 can include several active tiers and/or several archive tiers.

In embodiments, the archive tier 270 comprises a tape library and/or an optical library. The archive tier may in fact comprise one or more tape libraries. A tape library includes tape drives and cartridges, where the latter may exceed the number of tape drives and be automatically inserted in the tape drives, as needed. In some embodiments, low-end HDDs may further be involved as part of the archive tier 270. However, often cheaper solutions can, in principle, be achieved with tape or optical libraries (primarily because the corresponding drives need not be constantly on and some of the archived data can be stored off the drives).

On the other hand, the active tier 240 can, for instance, comprise solid-state drives and/or hard-disk drives. Identical storage devices or at least devices having identical storage characteristics can be used in each tier. For completeness, and as evoked earlier, any or each of the tiers 240, 270 can be a cloud-based storage tier.

The control unit 30, in order to dimension the tiers 240, 270 of the storage system 200 and to determine assignments of data to be stored in the tiers can include a classifier unit, a dimensioning unit, and a classifier reconfiguration unit. To that aim, the control unit 30 takes into account another type of workload as input, i.e., the archiving/prefetching workload. Such inputs can be taken into account, in addition to other inputs, such as a budget, the device characteristics, and additional workload characteristics. Some manual control can be allowed in some embodiments. Additional details are provided below.

The prior art unit 2 includes a reconfigurable classifier unit 21, a dimensioning unit 22 and a classifier reconfiguration unit 23. These classifier unit, dimensioning unit, and classifier reconfiguration units of the control unit 30 form a control loop for determining and optimizing a number of storage devices and for determining and optimizing an assignment of data across the storage tiers. When the classifier reconfiguration unit determines that a termination condition of the control loop is fulfilled, the classifier reconfiguration unit outputs a signal indicating this fact.

When the control loop is finished, an optimized number of storage devices is assigned to each storage tier. The number of storage tiers also depends on the number of different kind of storage devices needed for the data to be stored as each storage tier includes storage devices of one kind. Further, an optimized assignment of data to the different tiers is provided.

In order to achieve this optimization, the reconfigurable classifier unit receives a first set of parameters. The first set of parameters consists of parameters indicating characteristics of the data to be stored and parameters indicating characteristics of the storage devices.

The classifier reconfiguration unit determines (initializes or updates) a second set of parameters. The second set of parameters consists of the classifier unit configuration parameters, used to configure or reconfigure the classifier unit. For determining the second set of parameters, an estimated performance metric value can be used when available, and one-time or interactive user input or a predefined rule can be used for restricting the space of the second set of parameters or for defining discretization or sampling rules for the second set of parameters.

The reconfigurable classifier unit uses a utility function for determining an assignment of the data to the plurality of storage tiers based on the first set of parameters and the second set of parameters. The output of the reconfigurable classifier unit represents the data-to-tier assignment. This serves as input to the dimensioning unit which further receives a cost value. The cost value can be a budget for the tiered storage system, a maximum number of storage devices being available, or the like.

The dimensioning unit determines a number of storage devices for each of the plurality of storage tiers based on the determined assignment, the received cost value, and a performance metric of interest, and estimates the performance metric value based on the determined assignment and the determined number of storage devices. When the termination condition is satisfied, a signal can be output to indicate this fact to the tiered storage system.

Note that the present methods and systems may take into account several (categories of) clients 10 or applications 10. This may in particular be the case when provisioning resources or when determining S52 a number of devices needed for the archive tier, when (re-)designing the latter. Namely, a number of devices may be determined for each of a plurality of clients 10 of the tiered storage system 200, based on actual or estimated data. Such numbers can be optimized based on workload characteristics and data assignments as determined S30, S40 for each of the plurality of clients/applications 10. The dimensioning capability provided by the present approach may hence be customized, on a per-client or per-application basis, and may further be dynamically updated based on current needs of the clients/applications.

Next, according to another aspect, a computer program product for managing a storage system, such as described above, can be implemented. This computer program product comprises a computer readable storage medium having program instructions embodied therewith, where the program instructions are executable by one or more processors, to cause the control unit 30 to perform all or part of the methods described herein (e.g. blocks S30, S40). The program instructions can be executable by one or more processors of one or more computerized entities as discussed in more detail below.

The above embodiments have been succinctly described in reference to the accompanying drawings and may accommodate a number of variants. Several combinations of the above features are also contemplated. Examples are given in more detail below.

One aspect of designing and managing a storage system is to optimize data access performance as experienced by the users and applications. Furthermore, one may want to consider a limited storage system cost (budget). Such considerations still hold for a storage solution that includes archive tiers. Here, the optimal data placement across the tiers (and the optimal number of devices in the active and archive tiers) may depend on the overall amount of data and data access workload (including archiving/prefetching workload), but also on the available budget and device characteristics.

The optimization problem differs when archive tiers are involved, compared to the storage systems with active tiers only. This is because people and applications use active and archive tiers differently and expect different things from those, e.g., real-time responsiveness (I/O delay, and TOPS or bandwidth) for active tiers versus recall latency tolerance for archive tiers. Such aspects are considered in the specific solutions discussed below, which allow storage systems that include archive tier and archiving/prefetching operations to be optimized in many respects.

Such solutions address the problem of determining which data to archive (and which not), as well as the number of devices for the fast access (active) tiers and the archive tiers and the intra-tier data placement, in order to optimize data access performance and meet the most demanding recall latency expectations. Such solutions assume known inputs such as the expected or estimated user/application workload, the expected recall latency, the cost and performance (e.g., latency and bandwidth) characteristics of the devices considered, and the system cost (available budget) constraint.

It is further assumed that the workload can be described (measured, or derived from customer requirements) in terms of size of data units (as considered for tiering) and frequency and size of data I/O requests for each of the data units. The data units can be of variable size, e.g., files, or fixed size, e.g., a range of data blocks of a fixed size (often called extents). Example of requests are file system data requests. A possible optimization criterion is to minimize the average response time of the storage system I/O requests. Yet, the methodology used can be applied to other, similar data access performance measures.

Some aspects of the present solutions have been discussed above. Those aspects assume taking the archiving/prefetching workload into account, to derive a data assignment. In addition, a number of devices can be determined for each of the archival tier 270 and the active tier 240 of the storage system 200. That is, the decisions on what to archive and how to size the archive tier are based on the archiving/prefetching workload, which impact both the active and archival tiers.

The following solutions provide an optimized planning of resources (number of devices) for building a new or upgrading and existing storage system having an archive tier. This use case is hereafter referred to as "use case A". In addition to user/application workload and device characteristics, budget is also used as input. Optimized are: the number of devices (total or increment), the archiving decisions, the data placement. When applied at run-time in a storage system with fixed resources (the number of devices or the budget is fixed), only the archiving decisions and the data placement are optimized. This second use case, which is useful when archiving data to the cloud, is referred to as "use case B".

Be they applied at build-time or at run-time, such solutions can use a common, core algorithm as, in each case, archiving decision parameters are used and iteratively updated based on the estimated active (direct-access) tiers performance that is being optimized. Another common aspect is that the estimation of the active tiers performance takes into account both the user/application workload and the archive/prefetch workload that depends on the archiving decision at each iteration.

Each data unit (file or object) is assigned to an active tier (using a first set of parameters) and marked as to whether it should be archived (using a second set of parameters), or not. If a data unit is marked to be archived, then it is additionally assigned to an archive tier. It will then be stored on its active tier only during its active usage periods, which may significantly decrease the overall cost for storing that data unit. The approach is coupled with modelling and determining contributions of archived data to its active tier storage and data access requirements, so that the archiving and active storage dimensioning and data placement can be jointly optimized through an iterative procedure.

For the use case A, the archive tier resources needed to store the archived data (e.g., the number of tapes) and meet expected prefetch times (e.g., thanks to a sufficient number of tape drives) are determined. When the number of devices is optimized for both the archiving and active tiers, the cost of the archive tier need be subtracted from the overall budget to determine the residual budget available for the active tiers devices. Both decisions are typically made in an iterative manner, while optimizing the resulting active tier performance.

Solutions described herein determine, for a tiered storage system that includes an archive tier, which data to archive as well as the number of devices need for the fast access tier and the archive tier, and the data placement over those tiers. Such solutions make it possible to optimize data access performance such as the user requests' mean response time and meet recall latency expectations (data prefetch from archiving to active tier).

A particular combination of features used in some conventional systems is referred to herein "ExaPlan". Some embodiments described herein implement a modified ExaPlan which can improve system performance as discussed in more detail below. ExaPlan determines a number of storage devices for each of a plurality of storage tiers and an assignment of data to be stored in these tiers, assuming workload of each tier is only the workload of direct user data access. The number of storage devices and the data-to-tier assignment is chosen so as to maximize a performance objective (e.g., to minimize the storage system's mean response time under a given workload) under a budget constraint (the budget is used to purchase and run said storage system).

On a high-level, aspects of ExaPlan operate as follows. The (user or application) workload is represented by characterizing each data file for which the placement to an appropriate tier is to be optimized across multiple dimensions such as: the size of the data file (e.g., file size), the frequency of data requests (e.g., file system reads to the file), the size of requests (e.g., size of file system reads). Other characterization is possible.

To handle the scalability with respect to the number of data units (e.g., files) for which the placement to the most appropriate tier need be optimized, ExaPlan clusters the files, e.g., by separating the characterization hyperspace into cubes, and optimizes the placement on a per-cluster level. Files in a same cube have similar characteristics, such that placing those files on a same tier is expected to give a solution close to the optimal solution.

The optimization is done in an iterative manner. An optimal cluster-to-tier placement is searched for by using a workload classifier that assigns each cluster to a storage tier, based on classifier parameters. This is achieved by using a per-cluster evaluation and comparison of per-tier utility functions parameterized by the classifier parameters. The resulting cluster-to-tier and therefore file-to-tier placement allows to efficiently compute the workload of each tier in the current iteration. A so-called dimension optimizer then optimally dimensions the tiers (determines the number of devices on each tier) to maximize the system performance given the available budget, e.g., using the system's average response time as the optimization function. The change in the optimized performance is used as a feedback to the classifier reconfiguration unit to search for potentially better classifier parameters that are then used and evaluated in the same way in the next iteration.

Because the utility functions are designed to be sensitive to the performance and cost of the system and are smooth functions of the classifier parameters, the overall optimization method is able to find good solutions. Due to the design and efficiency of each of the processes involved, the overall optimization method is both scalable and efficient. Correlated changes to the classifier parameters when iteratively searching for better solutions can be used to provide better results and faster convergence.

In tiered storage systems that include an archive tier and archiving/prefetching operations, the features of ExaPlan can be used to optimize the tiers that are directly accessed. In addition, embodiments of the present methods additionally compute and take into account the modified active tier bandwidth and storage requirements arising from archiving and/or prefetching operations.

Assuming data placement and archiving decisions for each data unit (file) may be made separately, user workload and operation of storage with archiving function can be modeled in the following way:

The vector (q, r, v, R, T, Z) characterizes a data unit workload. All values are per data unit. Data units are hereafter assumed to correspond to files, for the sake of exemplification. In variants, data units may also correspond to, e.g., fixed size ranges of the storage blocks.
In the above vector, i stands for the file index;

Let I denotes an inactivity threshold, a system level parameter. If a file is not accessed for longer than I amount of time then it is considered inactive since the last access. A file that was never accessed is also considered inactive. The next access to the file starts its next active period. The start of the inactive period can be detected after a time I has lapsed and then the file can be archived, or not, depending on the optimization decision for that file; and In the above vector, q is an average request size when the file is in an active period (assuming an average active period or averaging over active periods); r corresponds to an average request rate when the file is active; v is the file volume; R is the frequency at which the file enters an active period; T stands for the average duration of the file in an active period and Z is an average lifetime of the file (i.e., the time period until a file is deleted from the storage system).

Detailed steps of the present solutions and their iterative procedures are illustrated in FIGS. 1-3. FIGS. 1 and 2 assume use case A (build-time), whereas FIG. 3 pertains to the second use case (use case B, run-time). The two approaches are essentially similar. FIG. 2 is now described in more detail.

The method disclosed in FIG. 2 works by executing the preparation block S20 (whereby a potential workload $WL_p''$ is modeled, mathematically), based on a vector provided at block S10, and then iterates blocks S30, S55, S59, S40, S52, S54, S60, S30 until a stopping criterion is reached. Examples of stopping criteria are a maximum execution time, a maximum number of iterations, or a difference in the optimization function in successive iterations that is less than a pre-defined threshold, when the number of iterations is above another pre-defined threshold.

Note that workload components arising due to the finite file lifetime Z of files are omitted from the formulas shown in FIG. 2, for conciseness. Such contributions are nevertheless discussed below.

The preparation block S20 assumes as input the observed or expected system usage traces, or an equivalent observed or expected system usage description from which an input user workload can be derived. For example, if a detailed trace of file system accesses is available (files are assumed to be on the online tiers while being accessed), and if a set of files are or can be associated with a project, which, for example, consists of a set of files that are accessed together, then it can be assumed that such files are collocated on a tape (or multiple tapes) and prefetched together to the online tiers before they are accessed for processing. In this example, it is possible to represent each project prefetch with one (or multiple) tape requests of a certain size and frequency. The frequency can be estimated based on the inactivity periods of the files. In general, the output of block S20 is a representation of the potential archiving workload ($WL_p''$), e.g., in terms of the data units accessed from the archive tier at once (file archiving/prefetching use case versus project archiving/prefetching use case) and frequency of the access.

In the file-level access use case, storing and accessing a file for which the user workload is described by (v, R, T, Z) may imply the following potential workload components on the archive tier:

(v, R, v)—for storing and prefetching the file: where the first element of this workload component is the size of prefetch read requests (equal to the file size v), the second element is the rate of the prefetch read requests (equal to the frequency R at which the file enters an active period), and the third element is the storage space requirement on the archive tier (equal to the file size v). Each element of such a vector can be regarded as an aspect of a workload component;

(v, 1/Z, 0)—for storing a new file (assuming average rate of storing new files is equal to the average rate of expiring old files, and assuming average file size statistic does not change). Here the first element is the size of archiving write requests (equal to the file size v), the second element is a rate of the archiving write requests (equal to the inverse value of the average lifetime Z of archived files), and the third element is the required archival tier storage space. The third element is equal to zero because the storage space is already accounted for by the workload component (v, R, v). Project level access cases can be modeled in a similar way.

At block S55, it is determined which files need be archived, based on the current iteration value of the classifier parameters for archiving. If only one archive tier is used in a storage system with multiple active tiers, a simple implementation may use a single parameter that represents a threshold for file (or project) frequency access in $WL_p''$, implying that all the files (or projects) below this threshold are archived. Yet, additional parameters may be involved and the archiving decision could additionally depend on data size (e.g., a project data size), for example. In case of multiple archive tiers, a utility function-based approach can also be used to decide if and to which archive tier data is assigned to, similar to the scheme used in ExaPlan for data-to-active tier placement. The classification parameters are initialized to any value that results in a feasible solution (that can be found e.g. using a random search), then updated in each iteration.

The actual archiving/prefetching workload of the archive tier S40 is then determined from the potential archiving/prefetching workload by summing the workload components of the files that are determined to be archived.

Blocks S52, S54 aim at determining the size and cost of the archive tier. For example, the number of tapes can be determined by the data to be archived S55, according to the current iteration. The number of drives is essentially determined by the archive/prefetch workload S40 assumed at the current iteration, and additionally by the prefetch time constraint. The same approach can be applied where optical disc storage media and shared optical drives (e.g., provided as part of optical disc libraries) are used. If a remote cloud storage is used as an archive tier, the prefetch latency is determined by the service level agreement and the cost can be computed based on the archiving decisions at the current iteration.

For example, if project data collocation on tapes and optimized tape read can be assumed, a prefetch request involves a tape mount, an initial seek, and an approximately sequential read of the requested files (due to optimized read order from a mounted tape the additional seeks, if any, can be neglected), and tape unmount. The operation of the tape tier can then be approximately modeled with a queuing system with M servers (drives) and one queue (queuing the tape requests) M/G/K and dimensioning can be done analytically using known results.

The service time for each request would include the mount, initial seek, read, and unmount time (under a specific unmount policy). To compute the average (project) prefetch time, the unmount time should be subtracted from the queueing model average response time result.

If the tape workload differs, another model can be used which can use a queue per tape and accounting for tape seeks. Other variants can be contemplated. At block S59, the active tier workload contribution from each file is determined, based on its data-to-active tier assignment and based on the archiving decisions (as in the current iteration):

$$(q, R \times T \times r, v) + (v, 1/Z, 0) \text{ for not archived files; and}$$

$$(q, R \times T \times r, R \times (T+I) \times v) + (v, 1/Z, 0) + (v, 1/Z, 0) + (v, R, 0) \text{ for archived files.}$$

In all cases the first element of the (x, y, z) notation corresponds to effective request size, the second element corresponds to the effective request rate, and the third element corresponds to the effective storage space required. For both archived and non-archived files, $R \times T \times r$ is a contribution to the active tier data access request rate, with average request size q. For non-archived files, (v, 1/Z, 0) represents an active tier workload for writing the file with lifetime Z to the storage (assuming a stationary regime). For archived files, an additional workload component (v, 1/Z, 0) is further involved for reads when migrating data from active to archive tier, and (v, R, 0) for recalling data from the archive tier. $R \times (T+I) \times v$ represents the effective storage space used by files prefetched from the archival tier to the active tier during the active time period of files (those archived during non-active time periods). For files that are not archived, storage occupancy on the active tiers is v. Here it is assumed that the temporarily prefetched files are still kept on the archival tier, so their subsequent archiving upon entering an inactive period does not incur data movement. If this assumption had to be changed, the above formulas for the workload components would need be adjusted accordingly, but the overall method could remain the same.

Any active tier optimization solution can be used at block S60. Accordingly, block S60 can comprise multiple subprocesses such as those discussed above with respect to the classifier unit, a dimensioning unit, and classifier reconfiguration unit of control unit 30 discussed above. In particular, block S60 can include initially setting or updating the probed classifier parameters. Updates are done based on the observed changes in the optimization function. For example, a customized covariance matrix adaptation evolution strategy (CMA-ES) algorithm can be used to efficiently and adaptively explore the archiving decisions and the online data placement options. At each iteration of the optimization algorithm, multiple archiving and placement parameters are derived from a covariance matrix and probed, and the most promising of the probed parameters are used to update the covariance matrix that is used in the next iteration. As a result, updated data assignment parameters are stored at block S30.

Another subprocess S66 of block S60 is to determine data placement in the active tier. Another subprocess S64 of block S60 involves a so-called dimension optimizer and aims at dimensioning the active tier, based on the active tier workload and the residual budget as obtained after subtracting the cost of the archive tier, so as to optimize S68 the active tier performance at the current iteration S60.

The embodiments discussed above (modified ExaPlan) can significantly improve the system performance as compared to conventional systems, starting with the average response times, especially at small budgets and if a large proportion of data qualify as "cold data". For example, the average response times can be improved by a factor of about two, or even by approximately two or more orders of magnitude, depending on whether ExaPlan was implemented with a direct tape access (without archiving/prefetching operations support) or without tape. Since ExaPlan already institutes a marked improvement over previous solutions, one understands that the present solutions can critically improve the system performances.

One possible use case (or application) is for dimensioning a new tiered storage system when the specification of the expected workload is available, to optimize the performance for a given budget, or to minimize the cost for given performance requirements, or to find a trade-off.

Another use case is to recommend a hardware upgrade for an existing tiered storage system, based on observed and/or extrapolated user workload (e.g., derived from usage traces and statistic).

Yet another use case is to continually optimize data-to-tiers placement in a given hardware configuration, in which case the dimensioning step in the optimization is skipped and instead the current number of devices in each tier is used as a constant.

The embodiments described herein can easily be adapted for use cases in which the archiving and/or the active tier uses different devices than those mentioned in the above examples, or is based on a cloud storage offering. For example, the archive tier could be based on optical disks. Similarities between, on the one hand, optical disks and cartridges and, on the other hand, optical drives and tape drives, can be exploited to extend the application of the embodiments described herein. In another practical example, the archive tier could be a cloud service. In this case the archive tier need not be dimensioned but the archiving decision S55 and/or some of the subprocesses of step S60 can be adapted, taking the cost of the archiving service into account. Only those archive tiers that satisfy a given file prefetch constraint can be used, in some embodiments, for archiving the file, a constraint that is straightforward to add to the optimization procedure. In yet another usage example, which can be combined with the previous one, the active storage tier resources could be rented from a cloud service provider.

Computerized devices can be suitably designed for implementing the embodiments described herein. In that respect, it can be appreciated that the methods described herein are largely non-interactive and automated. In some example embodiments, the methods described herein can be implemented either in an interactive, partly-interactive or non-interactive system. The methods described herein can be implemented in software (e.g., firmware), hardware, or a combination thereof. In some example embodiments, the methods described herein are implemented in software, as an executable program, the latter executed by suitable digital processing devices. More generally, the embodiments described herein can be implemented wherein general-purpose digital computers, such as personal computers, workstations, etc., are used, e.g., to implement the control unit 30 and server 210.

Figure 5:
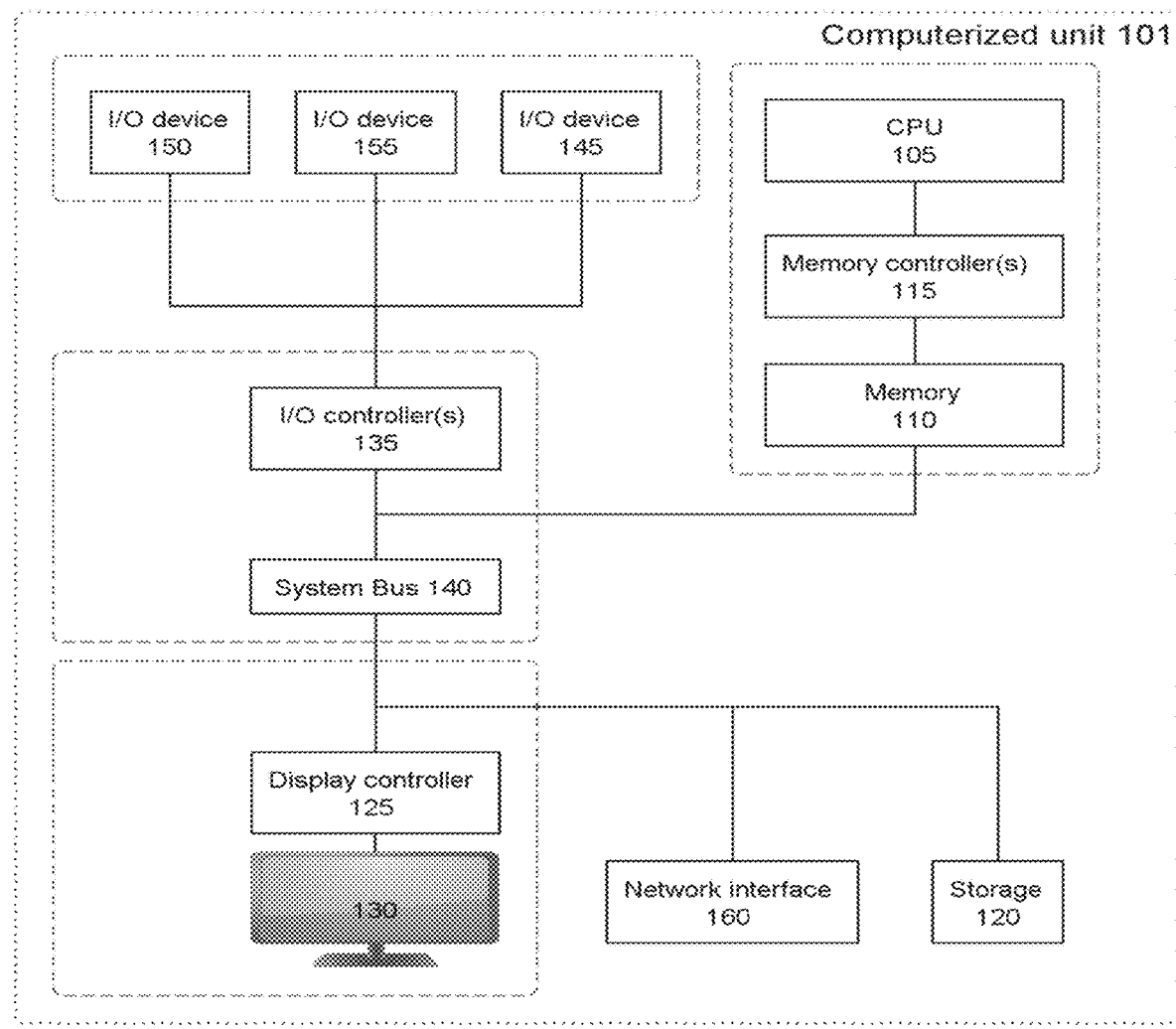
FIG. 5 schematically represents a general purpose computerized unit, suited for implementing one or more method steps as involved in embodiments.

For instance, the computerized system depicted in FIG. 5 schematically represents a computerized unit 101, e.g., a general-purpose computer, which may form part or all of the element 210 (a storage system computerized server) shown in FIG. 4. The same architecture may furthermore be used for the control unit 30, which may, in variants, form part of the element 210.

In exemplary embodiments, in terms of hardware architecture, as shown in FIG. 5, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. A system bus 140 may be present, in addition to the input/output controller 135.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 5, the software in the memory 110 includes methods described herein in accordance with exemplary embodiments and a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices.

In addition, the I/O devices 145-155 may further include devices that communicate both inputs and outputs. The computerized system can further include a display controller 125 coupled to a display 130. In some example embodiments, the computerized system can further include a network interface or transceiver 160 for coupling to a network.

The network transmits and receives data between the unit 101 and external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for managing a tiered storage system having an archive tier and an active storage tier, the method comprising:
   determining a workload and a prefetch time constraint for moving data between the active tier and the archive tier;
   determining an assignment of data to be stored across the active tier and the archive tier, based on the workload and the prefetch time constraint, wherein the workload determined is a workload for moving data from the active tier to the archive tier and for moving data from the archive tier to the active tier; and
   determining hardware resources for one or each of the active tier and the archive tier, based on both the assignment of data and the workload determined, wherein:
       determining said workload comprises determining one or more average frequencies of requests to move data from the active tier to the archive tier and from the archive tier to the active tier, as well as one or more average data sizes of such requests; and determining an optimal number of devices for the archive tier is based on the determined average frequencies and the determined average data sizes of the requests.

2. The method according to claim 1, wherein the method further comprises provisioning resources in the archive tier, based on both the assignment of data and the workload determined.

3. The method according to claim 1, wherein determining hardware resources comprises:
determining the optimal number of devices for the archive tier, based on the determined assignment of data, the determined workload and characteristics of the devices.

4. The method according to claim 1, wherein:
determining said workload further comprises determining one or more average storage durations of data as stored on the active tier before being archived to the archive tier; and
determining the optimal number of devices for the archive tier is further based on the average storage durations determined, in addition to the determined average frequencies and average data sizes of the requests.

5. The method according to claim 1, wherein the method further comprises:
after determining the workload, determining performances of the active tier based on the determined workload, whereby determining said assignment of data is based on the determined performances; and
determining an updated workload for moving data from the active tier to the archive tier and/or moving data from the archive tier to the active tier, based on the determined assignment of data.

6. The method according to claim 5, wherein the method further comprises:
determining a cost of the archive tier based on the determined workload, whereby the performances of the active tier are determined based on the determined workload and cost and determining said assignment of data is based on the determined performances; and
determining an updated workload for moving data from the active tier to the archive tier and moving data from the archive tier to the active tier, based on the determined assignment of data.

7. The method according to claim 6, wherein said cost is determined based on the optimal number of devices for the archive tier, wherein the optimal number is determined based on the determined workload, the determined assignment of data and characteristics of the devices; and
wherein the method further comprises:
determining a remaining budget for the active tier based on the determined cost of the archive tier and a budget constraint, whereby said performances of the active tier are determined based on said remaining budget.

8. The method according to claim 1, further comprising:
determining, for each of a plurality of clients of the tiered storage system, a respective number of devices in the archive tier, wherein the respective number is optimized based on workload characteristics and data assignments as determined for each of the plurality of clients.

9. The method according to claim 1, further comprising:
moving data across the active tier and the archive tier, based on the determined assignment.

10. A control unit for a tiered storage system comprising an archive tier and an active storage tier, the control unit comprising:

a memory configured to store executable instructions; and
a processor communicatively coupled to the memory and configured to execute the executable instructions which cause the processor to:
determine a workload and a prefetch time constraint for moving data between the active tier and the archive tier;
determine an assignment of data to be stored across the active tier and the archive tier, based on the workload and the prefetch time constraint, wherein the workload determined is a workload for moving data from the active tier to the archive tier and for moving data from the archive tier to the active tier; and
determine hardware resources for one or each of the active tier and the archive tier, based on both the assignment of data and the workload determined, wherein:
the workload is determined by determining one or more average frequencies of requests to move data from the active tier to the archive tier and from the archive tier to the active tier, and one or more average data sizes of such requests; and
determine an optimal number of devices for the archive tier based on the determined average frequencies and the determined average data sizes of the requests.

11. The control unit according to claim 10, wherein the processor is configured to determine hardware resources by:
determining the optimal number of devices for the archive tier, based on the determined assignment of data, the determined workload and characteristics of the devices.

12. The control unit according to claim 10, wherein the processor is further configured to:
determine one or more average storage durations of data as stored on the active tier before being archived to the archive tier; and
determine the optimal number of devices for the archive tier based on the average storage durations determined, in addition to the determined average frequencies and average data sizes of the requests.

13. A computer program product for managing a tiered storage system having an archive tier and an active storage tier, the computer program product comprising a computer readable storage medium having program instructions embodied therewith, the program instructions being executable by one or more processors, to cause the one or more processors to:
determine a workload and a prefetch time constraint for moving data from the active tier to the archive tier and moving data from the archive tier to the active tier; and
determine an assignment of data to be stored across the active tier and the archive tier, based on the workload and the prefetch time constraint, wherein the workload determined is a workload for moving data from the active tier to the archive tier and for moving data from the archive tier to the active tier; and
determine hardware resources for each of the active tier and the archive tier, based on both the assignment of data and the workload determined, wherein:
the workload is determined by determining one or more average frequencies of requests to move data from the active tier to the archive tier and from the archive tier to the active tier and one or more average data sizes of the requests; and
determine an optimal number of devices for the archive tier based on the determined average frequencies and the determined average data sizes of the requests.

* * * * *